2980

Samuel Vansyckel.

Grate-Bars

Reissued

Jun 9 1868

Patented October 31. 1854

United States Patent Office.

SAMUEL VANSYCKEL, OF TITUSVILLE, PENNSYLVANIA.

*Letters Patent No.* 11,879, *dated October* 31, 1854; *reissue No.* 2,980, *dated June* 9, 1868.

IMPROVEMENT IN GRATE-BARS.

The Schedule referred to in these Letters Patent and making part of the same.

TO ALL WHOM IT MAY CONCERN:

Be it known that I, SAMUEL VANSYCKEL, of Titusville, Crawford county, State of Pennsylvania, formerly of Little York, in the county of Hunterdon, and State of New Jersey, have invented a new and useful Improvement in Grate-Bars for furnaces; and I do hereby declare the following to be a full, clear, and exact description thereof, reference being had to the accompanying drawings, and the figures and letters of reference thereon, making part of this specification. In the said drawings—

Similar letters of reference indicate like parts in all the drawings.

On the 23d of August, 1853, Letters Patent of the United States were granted to me for the construction of grate-bars, with a hook on the under side, and a supporting-bar or rod to prevent the bars from twisting or warping; but the hooked bars as made in my said patent were practically defective for this reason, that while the bar was supported and held in position at the centre by the rod, there was nothing to prevent the bars warping and twisting throughout the other parts of their length, and as certain portions of the bars were subject to different degrees of heat, the bars would soon become badly twisted and warped, except at the point where they were held, for want of a proper support both vertically and horizontally.

My present invention entirely obviates these difficulties, and is a great improvement upon my said original patent. It consists in providing or constructing the projections upon one side of the bar with pins, tenons, or projections, and the other side with corresponding mortises or recesses, whereby an entire series of bars can be interlocked and held together and made self-sustaining throughout their entire length.

The principal object of my invention is to so construct grate-bars, that a broken or defective bar may be readily replaced by a perfect bar, and also to prevent their being twisted or warped by the heat.

To enable others skilled in the art to make and use my invention, I will describe its construction and operation.

A represents the grate-bar, which may be constructed of any desired size and form, and B B are the projections for keeping the bars a proper distance apart to form draught-spaces, and allow for the raking of the fire.

Figure 1:
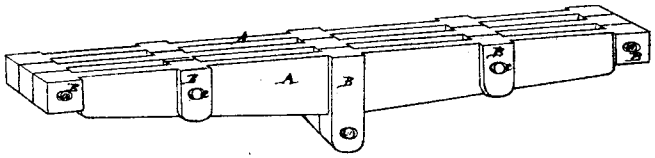
Figure 1 shows a perspective view of a series of bars interlocked together.
Figure 2:
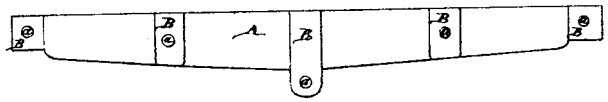
Figure 2 is a side elevation of a bar, showing the tenons or projections.
Figure 3:
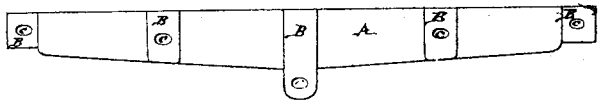
Figure 3 is a side elevation, showing the mortises or cavities to receive the tenons or projections of the adjacent bar.

These bars are cast in pairs, one of each being represented in figs. 2 and 3.

Of that represented in fig. 2, *a a* are pins or projections cast or secured to the bar, and may project from each side of the bar to a distance equal to about half their width at the braces, or the pins or projections may extend on one side only of the bar, and reach towards the centre of the bar, with a recess or mortise opposite to it for a corresponding projection or pin on the next bar of the set to enter. These pins, projections, or catches may be round, square, angular, or oblong, the recess or mortise into which they enter or catch being of corresponding form or shape.

In fig. 3 is shown the other bar of the pair or set, it being represented with mortises or holes *c c*, &c., through the bar at each of the braces or projections.

The pins or projections on the one bar enter the corresponding openings in the other, and thus the whole series is firmly held and locked together to prevent warping, twisting, or dropping from the end-plates or walls.

The mortises *c c*, or other devices, should be enlarged lengthwise of the bar, for the purpose of allowing for any unequal expansion of the metal in the bar and in the projection.

The expansion in the transverse direction is not of sufficient consequence to render it necessary to make any provision for it.

The projections B may all or any portion of them extend down below the bottom of the bar as does the centre one of each bar, or they may all lie between the bars, without extending above or below them.

It will be obvious that the form and shape of the interlocking-devices may be varied, and yet be within the scope of my invention.

Having thus fully described the nature of my invention what I claim, is—

Constructing grate-bars with pins or projections on one of the sides of the bar, and with corresponding mortises or recesses in the other side, whereby the bars can be interlocked and held together, and made self-sustaining throughout their entire length, substantially as described and specified.

SAMUEL VANSYCKEL.

Witnesses:

WM. M. ANDERSON,

EDWARD E. OSBORN.